(12) United States Patent
Sanda et al.

(10) Patent No.: US 9,253,115 B2
(45) Date of Patent: Feb. 2, 2016

(54) METHODS AND SYSTEMS FOR CONTROLLING NETWORK SERVICE QUALITY

(71) Applicant: Japan Communications Inc., Tokyo (JP)

(72) Inventors: Frank Seiji Sanda, Tokyo (JP); Naohisa Fukuda, Nagano (JP); Kevin K. Taylor, Lafayette, CO (US); Kenichi Goto, Kanagawa (JP); Yasushi Shibuya, Greenwood Village, CO (US); Corey Mitchell, Greenwood Village, CO (US)

(73) Assignee: Japan Communications Inc., Englewood, CO (US)

( * ) Notice: Subject to any disclaimer, the term of this patent is extended or adjusted under 35 U.S.C. 154(b) by 94 days.

(21) Appl. No.: 13/958,352

(22) Filed: Aug. 2, 2013

(65) Prior Publication Data

US 2014/0036666 A1 Feb. 6, 2014

Related U.S. Application Data

(60) Provisional application No. 61/679,626, filed on Aug. 3, 2012.

(51) Int. Cl.
*H04L 12/927* (2013.01)
*H04W 28/18* (2009.01)

(52) U.S. Cl.
CPC ............. *H04L 47/805* (2013.01); *H04W 28/18* (2013.01)

(58) Field of Classification Search
CPC .............................. H04L 47/805; H04W 28/18
See application file for complete search history.

(56) References Cited

U.S. PATENT DOCUMENTS

| | | | |
|---|---|---|---|
| 2007/0297329 A1 | 12/2007 | Park et al. | |
| 2008/0171529 A1 | 7/2008 | Bartter et al. | |
| 2013/0130642 A1* | 5/2013 | Joul et al. | 455/406 |
| 2014/0160923 A1* | 6/2014 | Joy et al. | 370/230 |

FOREIGN PATENT DOCUMENTS

| | | |
|---|---|---|
| JP | 2010136257 | 6/2010 |
| JP | 2010146564 | 7/2010 |
| JP | 4911737 B1 | 4/2012 |

* cited by examiner

*Primary Examiner* — Mohammad Anwar
(74) *Attorney, Agent, or Firm* — Wilson Sonsini Goodrich Rosati

(57) ABSTRACT

Methods and systems are provided for controlling network service quality. According to an aspect of the invention, a computer-implemented method is provided for controlling levels of quality of service (QoS) for transmitting data between a terminal and a destination. The method comprises enforcing a first level of a QoS to a connection between the terminal and the network, receiving a user-requested, second level of the QoS from the terminal, identifying a currently-available level of the QoS on the network, determining a third level of the QoS based at least in part on the currently-available level of the QoS on the network and the second level of the QoS, and enforcing the third level of the QoS. Methods and system are provided for enabling users at the terminals to specify online a level of network QoS, and the system dynamically changes the quality level and the plan to satisfy the request.

14 Claims, 11 Drawing Sheets

METHODS AND SYSTEMS FOR CONTROLLING NETWORK SERVICE QUALITY

CROSS-REFERENCE

This application claims the benefit of U.S. Provisional Application No. 61/679,626, filed Aug. 3, 2012, which application is incorporated herein by reference.

BACKGROUND OF THE INVENTION

In telecommunications, users of terminals typically subscribe to service plans that are offered by telecommunications operators, and use the services according to the services parameters set forth by the plan. The terminals may be computing devices or mobile devices, including, but not limited, to computers, smartphones, and/or tablets.

For example, if a user is under either a prepaid or post-paid data telecommunication plan that allows data transmission speed up to a predetermined amount such as 300 Kbits per second, the network speed that the terminal is allowed to attain is limited to that speed. Typically, higher quality services such as levels of faster network speed are offered at higher price plans, because a higher quality of services (QoS) would consume more resources on the network operated by the telecommunications operator. Moreover, quality of services is typically configured and enforced by telecommunication operators to protect their network resources, and throttling may be used as a means to penalize users whom the telecommunications operators have determined are abusing the network by transmitting an excessive amount of data over the network.

However, there are cases where users who are under a less expensive plan with a limited quality of service (e.g. network speed) temporarily need a better quality of service by dynamically boosting average or maximum network speed to optimally transmit data during special circumstances, even if it means the users must pay more for the temporary change of the service. In another instance, users may wish to dynamically change their designated quality of service based on how they intend to use the terminal to communicate data over the network. According to conventional implementations, users typically have to purchase a service with higher quality of service on a long-term basis and waste the additional network resources that the users would not consume.

There is a need to provide mechanisms to flexibly accommodate selections of various levels of quality of services of networks by users, and dynamically change plans in real-time or within a predetermined time period among different qualities of services configurations, while striking a balance with network resource management that network service providers are responsible for. Such a mechanism would require ways to switch billing methods as well as managing quality of services in a near-real-time basis.

INCORPORATION BY REFERENCE

All publications, patents, and patent applications mentioned in this specification are herein incorporated by reference to the same extent as if each individual publication, patent, or patent application was specifically and individually indicated to be incorporated by reference.

SUMMARY OF THE INVENTION

Methods and systems for controlling network service quality are provided. According to an aspect of the invention, a computer-implemented method is provided for controlling levels of quality of service (QoS) for transmitting data between a terminal and a network. The method comprises enforcing a first level of a QoS to a connection between the terminal and the network, receiving a user-requested, second level of the QoS from the terminal, identifying a currently-available level of the QoS on the network, determining a third level of the QoS based at least in part on the currently-available level of the QoS on the network and the second level of the QoS, and enforcing the third level of the QoS.

According to another aspect of the invention, a computer-implemented method is provided for controlling levels of quality of service (QoS) for transmitting data between a terminal and a communication destination over a network. The method comprises displaying a current and selectable levels of a QoS on the terminal to a user operating the terminal, enforcing a first level of QoS to a connection between the terminal and the communication destination, receiving a request to enforce a second level of the QoS from the terminal, determining a third level of the QoS based at least in part on the communication destination and the second level of the QoS, enforcing the third level of the QoS to the connection, and providing information about the third level of QoS to the terminal.

According to another aspect of the invention, a computer-implemented method is provided for providing specific combinations of maximum network speeds and maximum bandwidths by network traffic control. The method comprises enforcing a first combination of a first maximum network data speed and a first maximum data volume to one or more connections between a terminal and a communication destination over a network when the terminal is connected to the network, receiving a user-specified request from the terminal for a second combination of a second maximum network speed and a second maximum data volume while the terminal is connected to the network, and enforcing the second combination of the second maximum network data speed and the second maximum data volume to at least some of the one or more connections between the terminal and the network.

According to another aspect of the invention, a system is provided for providing a specific maximum network speed by real-time modulation of network traffic control. The system comprises one or more processors, and memory, including instructions executable by the one or more processors to cause the computer system to at least enforce a predetermined maximum network speed to one or more connections between a terminal and the network, receive a request for a desired maximum network speed from the terminal, validate the desired maximum network speed based at least in part on a user account balance, enforce the desired maximum network speed to at least some of the one or more connections between the terminal and the network, detect invalidity of the desired maximum network speed, and change, in response to the detected invalidity, the currently-enforced maximum network speed to the predetermined maximum network speed.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 9 illustrates an example system where more than one cellular network are available for the Terminal to connect to.

DETAILED DESCRIPTION OF THE INVENTION

The present invention facilitates the providing of multiple levels of quality of services (QoS) of communication service over network to users of the services so that the users may dynamically select a level of QoS, while the integrity of the overall communication system is maintained to provide data communication services to its users. Users of client devices are able to specify and change between levels as they use the services, based on trade-offs such as data transmission speed over the network, data volume that is permitted to transmitted over the network, pricing, and the like.

Parameters that constitute the communication service quality include but are not limited to maximum or minimum network speed (e.g., either guaranteed or on best-effort basis), maximum data volume that is permitted to transmit over the network, latency of data transmission, priority of data traffic to and/or from the user's client devices with respect to traffic for other devices on the network, and the like. Service quality based on best-effort basis means that the system is to provide an available level of service quality that is closest to the level as specified based on conditions of network traffic at the time.

Figure 1:
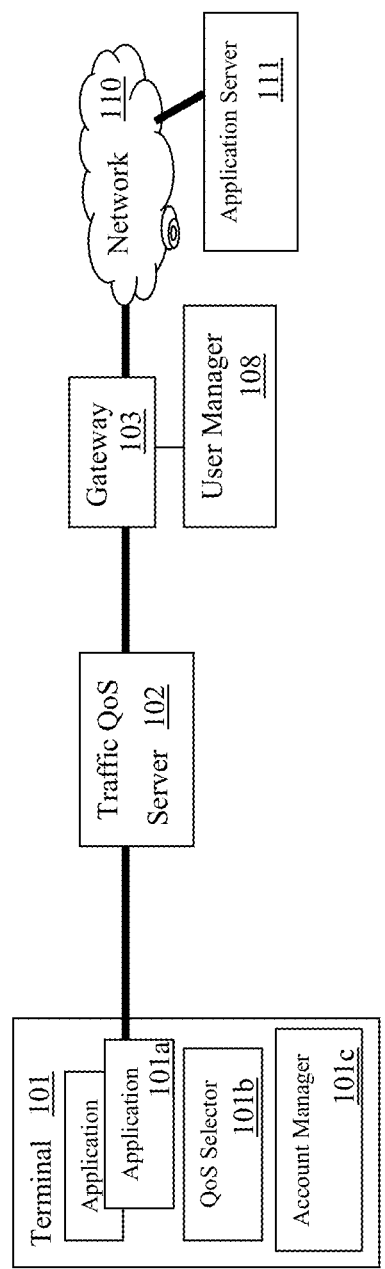
FIG. 1 illustrates an example system that provides network quality of service (QoS) that can be dynamically changed as specified by user operating a terminal.

One embodiment of the invention provides a telecommunication data system featuring a hybrid or combination of a volume-based, high-bandwidth service and a lower-bandwidth-based, unlimited-volume services. FIG. 1 illustrates example system environment 100 for implementing the present invention, in accordance with an embodiment. In the illustrated embodiment, the system may include a terminal 101, such as a smartphone, which user uses, to connect to a network 110 such as the Internet. The terminal contains one or more Applications 101a. A user operating the terminal 101 can select a QoS of the network traffic on the terminal using a QoS Selector 101b while connected to the network 110. The terminal may include an Account Manager 101c that is configured to manage a remaining balance of the user's account that enables the user to purchase a service with a higher level of QoS. In some cases, the service with a higher level of QoS may be a volume-limited service allowing a high, best-effort network speed. For example, a packet plan with the higher level QoS may offer a network speed as high as 75 Mbits per second downlink and 25 Mbits per second uplink, but the data plan may have a limitation on the maximum data volume, such as 1 Gbytes per month, that may be transmitted under the plan. The plan may expire or prevent the user from operating under the plan when the total amount of data transmitted under the plan reaches the maximum data volume. The data lan with the normal level of QoS may provide a limited data transmission bandwidth of, for example, 300 kbits per second, without limitation on data volume being transmitted. The QoS Selector 101b allows the user to select a plan with different levels of QoS, such as between a volume-based, high-bandwidth service and a lower-bandwidth-based, unlimited-volume service. The QoS Selector may communicate plan information such as selected by the user to a Traffic QoS Server 102. Upon receiving the plan information, Traffic QoS server 102 may change the setting of maximum network speed as specified by the selected plan, and control the speed accordingly. A gateway 103 may be configured to connect the an internal network including the Traffic QoS server 102 to an external network 110 such as the Internet 110 so as to enable communication between the Terminal 101 and an Application server 111 via the external network 110. A User Manager 108 may be configured to manage user account data and corresponding data service plan information. The User Manager 108 may be used by the Gateway 103 to selectively allow and/or restrict data traffic between the Terminal 101 and the Application Server 111.

Figure 2:
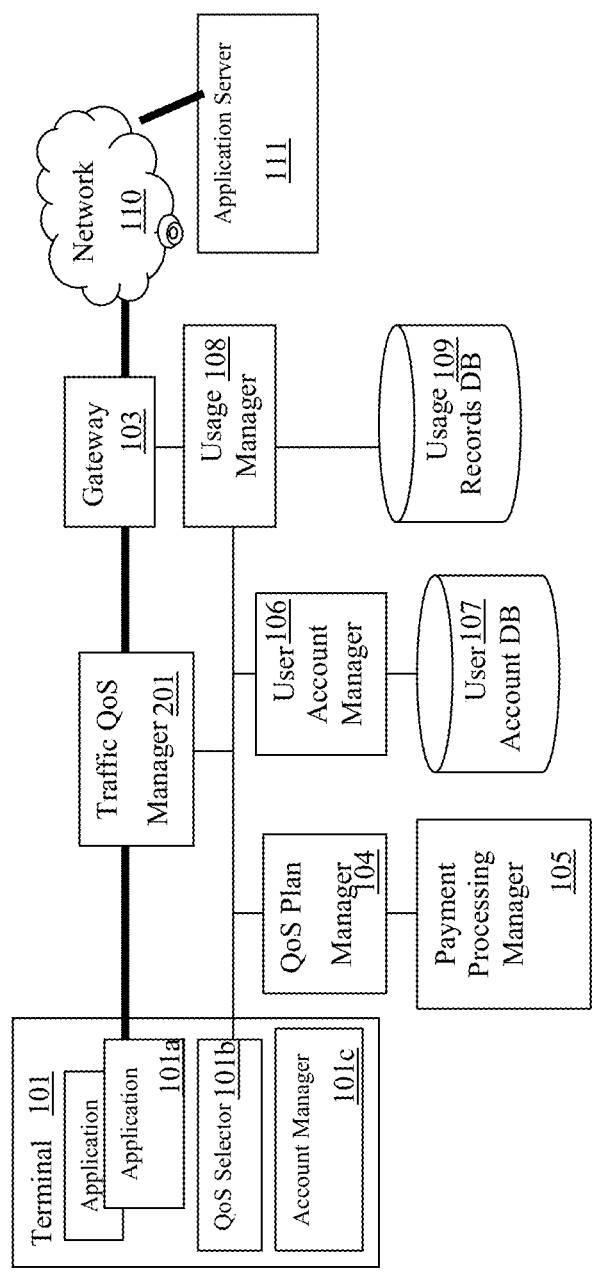
FIG. 2 illustrates an example system where a user may purchase and specify a mode of network service, and QoS is selectively enforced as specified by the user.

FIG. 2 illustrates an example system 200 where a user can purchase the higher QoS plan or the rights to use the higher QoS online as the user connects to the network. A QoS Plan Manager 104 may be configured to manage different service plans with different levels of QoS along with respective pricing. A Payment Processing Manager 105 may be configured to receive credit card information for processing payment when the user requests to purchase a QoS service plan online. The Payment Processing Manager 105 may be in communication with the QoS Plan Manager 104. A User Account Manager 106 may be configured to manage user account information as well as User Account DB 107 to record account usage logs as well as purchase records for service plans. According to this example system 200, user data traffic may flow in a communication channel that is separate from a communication channel that transmits control data to manage QoS of connectivity. The QoS Selector 101b specifies a selection or plan of QoS to the QoS Plan Manager 104; the QoS Plan Manager 104 communicates with Payment Processing Manager 105 when the user purchases a plan to process the payment transaction. The Traffic QoS Manager 201 manages and provides various levels of quality of service, such as but not limited to the maximum network speed and bandwidth, as specified by the QoS Plan Manager 104 on respective data connections with terminals. The QoS is applied to data communication between the Applications 101a on the terminal 101 and a network such as the Internet 110. The Gateway 103 connects the interior network of the telecommunication service provider with the external network such as the Internet 110, and also provides connection usage information to the Usage Manager 108. The Usage Manager 108 stores connection usage information such as time and amount of data traffic for respective connections with terminals, and stores the data in the Usage Records Database 109.

Accordingly, the user of the terminal may specify a level of quality of service (QoS), such as but not limited to the maximum speed of the network permitted, by purchasing and activating a service package plan with a desired level or mode of QoS on the terminal. The user may then enjoy a higher quality of network service until the need for such higher quality of network service is no longer needed, or until the service package plan expires or usage limits are reached. Once the higher QoS mode ends, the system changes the QoS to the normal level as specified by the user subscription information. There is no limitation as to how often and how long the user may utilize the higher QoS mode, as long as the user has a valid service package plan for the higher QoS mode. There is a benefit for the overall network management to allocate network resources as the network can selectively provide additional network resources to only those users who are qualified to use the additional network resources and also those who request the higher QoS on a limited-time basis (e.g., for a limited period of time).

According to one embodiment of the invention, a method is provided to dynamically control quality of network services for respective users based on service plans in which users dynamically select and switch one service plan from another from the terminals while they are connected to the network. The users may select and purchase online a plan that best suits the particular user's needs at the time. Different plans may have different parameters of quality of service as well as different pricing to represent the specific plan being offered. Parameters of such quality of service may include, but are not limited to, guaranteed maximum network speed, minimum network speed, average bandwidth, latency of data communications, resolutions of particular types of data such as video data transmitted over the network, error rates of transmitted data bits and frames, directions (uplink/downlink) of data transmission, various levels of data security such as data encryption and the like.

According to one embodiment of the invention, QoS, such as but not limited to the guaranteed maximum network speed, is applied not upon activation or enablement of a higher level of QoS, but within a time period that is specified by the Traffic QoS Manager 201 when a higher QoS mode is requested by the user. The time period is specified based on various network status indicators such as consumed average data traffic bandwidth, average latency of the overall network and the like. The Traffic QoS Manager 201 may notify the terminal about the estimated time period and/or the date or time of the switch-over; the time is then displayed to the user at the terminal. An application program hosted by the terminal may be notified by such a component as the QoS Selector 101b. In some cases, such notification may trigger the application to start transmitting data at the switch-over time. Such a feature is useful, for example, when a user at the terminal needs to transmit a large amount data over the network to a server or to a peer terminal but at the lowest possible cost. The suitable time for such transmission may be determined based on the traffic, load, and other characteristics of the network and may vary based on the time of the day. For example, in some instances, the application may be appropriately notified to transmit the data at the lowest possible cost such as during very early morning hours when the overall network traffic is low.

According to another embodiment, the QoS Plan Manager 104 provides a means of initiating a transaction for a partial or full refund of the amount that the user has paid to purchase the higher QoS 104 mode if the Traffic QoS Manager 201 detects that the QoS mode did not change to the higher QoS within a time period that is specified by the Traffic QoS Manager 201.

Upon providing a partial or refund to the user via the Payment Processing Manager 105, the QoS Plan Manager 104 notifies QoS Selector 101b on the Terminal 101 that the Terminal 101 is not in the higher QoS mode.

The terminals may be the same type of device and/or may include different types of devices. For example, the devices may be computing devices or mobile devices, including but not limited to computers, smartphones, and/or tablets. The devices may interact with the system and communicate over networks and web servers via a network such as the Internet, or on a private network that is not exposed to the public network. The communication between a network device and a network may be, for example, a connection between a client computer and a cellular network. One or more networks may communicate with one or more computers or other network devices across a particular network. For example, a plurality of devices may communicate via a single network, or via a plurality of networks. The network, for example, can include a private network, such as a LAN, or interconnections to other parties over a communications network, such as the Internet or World Wide Web or any other network that is capable of communicating digital data, such as a wireless, cellular, or telecommunications network. Each computer or network device may connect to one or more web server over the network using data protocols, such as Hypertext Transfer Protocol (HTTP), Hypertext Transfer Protocol Secure (HTTPS) and the like.

In accordance with embodiments of the invention, as shown in FIG. 1, a user may interact with a variety of networks via a mobile device (e.g., tablet, smartphone) or other network device that may form part of an overall system. The device may include various network interfaces to communicate with cellular networks, 802.11 networks or other IEEE standards based networks. When a network device is communicating with the networks, the device may have a processor and a memory that may store an operating system (OS) and a browser application or other application to facilitate communications with the web server. For example, the operating system may be configured to provide a graphical user interface to the user and to permit the user to execute other computer programs, such as a browser application, such as Microsoft Internet Explorer, Mozilla Firefox. Such a browser application, when executed by the processor, may enable the user to access the World Wide Web. Similarly, other applications or "apps" on mobile devices may be used. Any display known in the art may be used including, but not limited to, a cathode ray tube, a liquid crystal display, a plasma screen, a touch screen, an LED screen, or an OLED display.

Another embodiment of the invention provides methods of implementing Turbo mode, during which a specific user who uses the terminal in the Turbo mode can enjoy a network speed that is higher than the normal speed. For example, if the normal speed offered is 300 kbits per second, the Turbo mode may offer an increased network speed as high as 75 Mbits per second downlink and 25 Mbits per second uplink.

Figure 5:
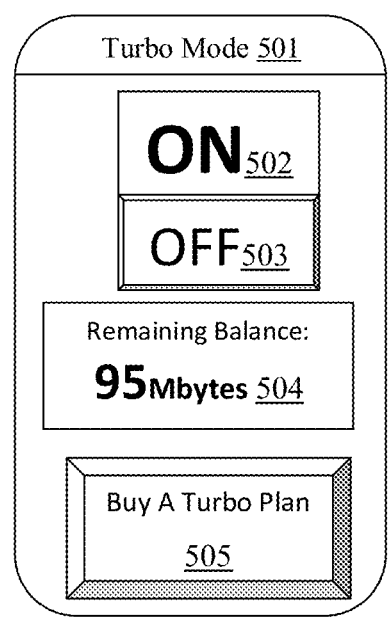
FIG. 5 illustrates a screen displayed on the terminal about the Turbo Mode status, remaining balance volume, as well as a selection feature for the user to purchase the rights to use the Turbo Mode.

FIG. 5 illustrates an example of user interface of a Turbo Mode manager displayed on a terminal as Turbo Switch application 301. The terminal displays the current status of the Turbo mode as ON 502 or OFF 503. The illustration shows the mode status as being "ON" 502, and the "OFF" button 503 is selectable for the user to turn off the mode to return to the normal network speed. When the mode is OFF, the "ON" area 502 becomes selectable and the "OFF" 503 becomes no longer selectable so that the user can select to turn the mode ON. The illustration may also show the remaining balance of the Turbo plan. Here the balance is described in terms of data volume. In other embodiments, the balance can be described in terms of time period or other units, which is purchased either as prepaid or post-paid by the user. The user is required to have a remaining balance as described in data volume, for example, in order to turn on and enjoy the faster network by turning the Turbo mode "ON". The illustration also shows a button that the user can select to purchase the Turbo plan 505, or the rights to turn on the Turbo mode. In this example, a Turbo plan provides 100 Mbytes of data communication at the faster network speed of as much as 75 Mbits per second downlink and 25 Mbits per second uplink at the price of $5. The user pays $5 to purchase the plan, and then is entitled to turn on the Turbo mode, and enjoy the faster network speed until the transmitted data volume reaches 100 Mbytes. The user is allowed to purchase and combine multiple Turbo plans so that the maximum volume can be increased. Once the remaining balance becomes zero, the network turns the mode OFF, and changes the network speed to normal, such as 300 kbits per second. In this example, the base subscription of the data service is based on a predetermined maximum data bandwidth or network speed at 300 kbits per second without limitation on monthly data volume, whereas the Turbo mode is based on data volume, such as 100 Mbytes for $5, and the higher maximum speed of network is available within the maximum data volume that is purchased by the user. The user can turn on or off the Turbo mode whenever the user wishes, as long as it has a remaining balance.

Another embodiment of the invention provides methods of implementing a Saver mode, during which a specific user who uses the terminal in the Saver mode can enjoy a network speed that is lower than the normal speed, but also with lower pricing for the users to save money. For example, while the normal speed offered is 75 Mbits per second, the Saver mode may offer a reduced network speed with the maximum cap at 1 Mbits per second downlink and 300 kbits per second uplink. Offering such types of communication mode as user's selection may be useful for user who wishes to save the cost of using the communication system when they wish to use the network for applications for which a lower network speed is sufficient to appreciate the services without hindrance. Such applications may include email applications, or applications that wait for notifications from social media services. In such an embodiment, a user interface may be provided similar to that shown in FIG. 5, where a Saver mode selector button is provided to enable a user to select and deselect the Saver mode from a terminal that the user operates. The system then adjusts the network speed accordingly as long as the system can maintain the integrity of the network operations. Allowing customers to choose a lower QoS plan is beneficial for operators of network services as well, because the operators can allocate the unused bandwidths for other users.

In an additional embodiment of the invention, the duration and other parameters of a Turbo plan may be modified according to different implementations. The Turbo plan may utilize other methods of providing data access to users not limited solely to a data volume usage basis. For example, a Turbo plan could provide 5 minutes of data communication at the faster network speed or QoS with unlimited data volume, or enable users to select between multiple network speeds or other QoS factors with either an unlimited data volume or with a data volume usage limit. Variations of a Turbo plan include boosting network speed of downlink, uplink, or both directions at the Terminal 101.

Figure 3:
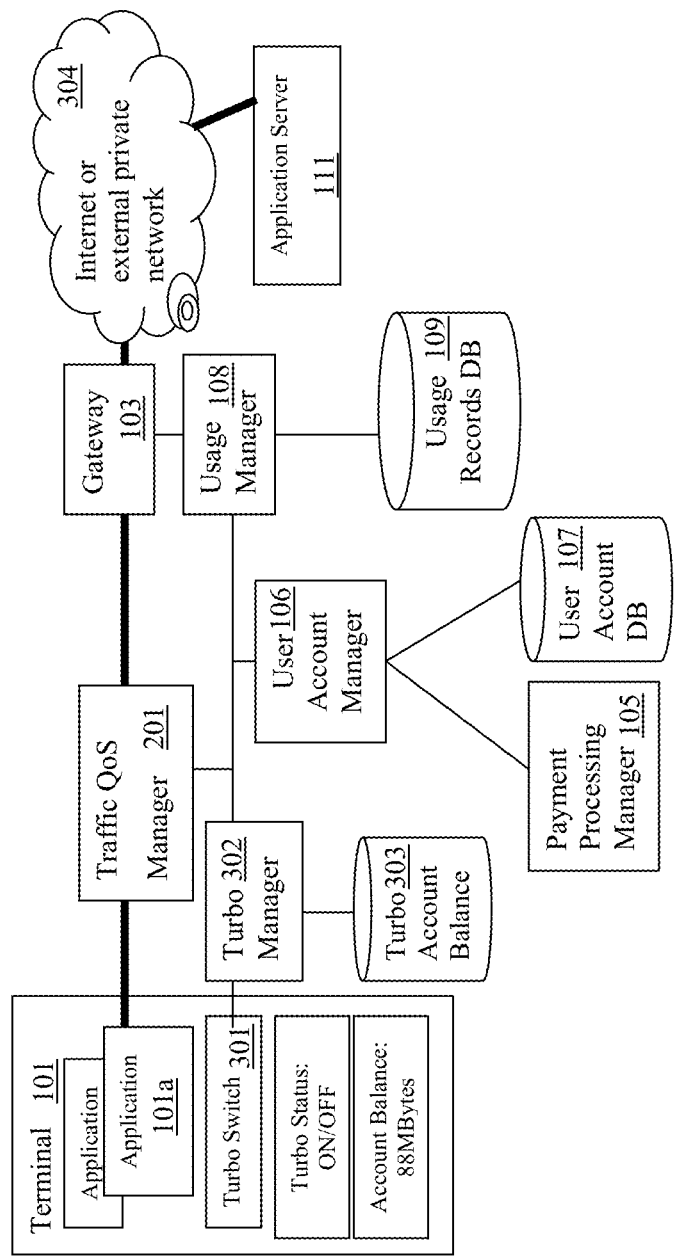
FIG. 3 illustrates an example system where a user may purchase and specify a mode of network service, for example, Turbo, which is selectively enforced as specified by the user.
Figure 6:
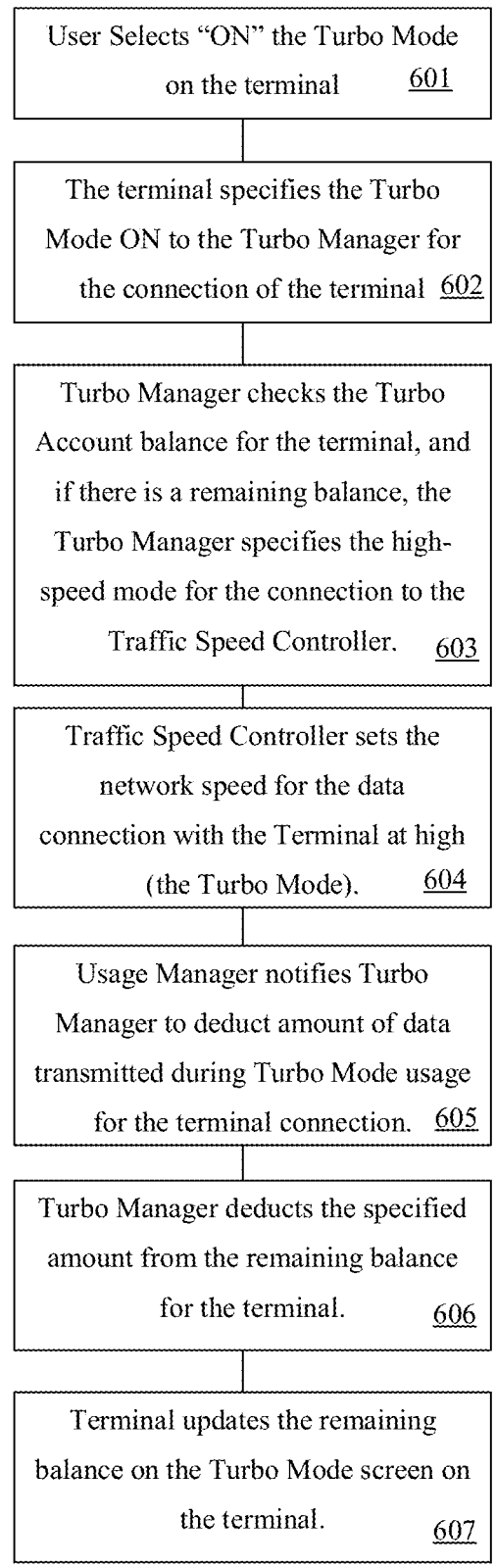
FIG. 6 illustrates an example process for activating Turbo Mode on a network when a user selects "ON" status as the Turbo Mode on the terminal screen.

FIG. 6 illustrates steps to activate the Turbo Mode (e.g., the mode of a faster network speed, implying an elevated mode of QoS) based on the system as described in FIG. 3. First, user selects 601 "ON" button on the Turbo Switch 301 on the terminal 101. Turbo Switch 301 then specifies 602 the Turbo Mode ON state to the Turbo Manager 302 at the telecommunications service provider with respect to a network connection of the terminal 101. The Turbo Manager checks 603 the Turbo Account balance for the terminal (or the user), and if there is a remaining balance, the Turbo Manager specifies the higher maximum network speed for the connection with the terminal to the Traffic Speed Controller. The Traffic Speed Controller sets 604 the network speed for the data connection with the terminal at high (the Turbo Mode). Then, the Usage Manager 108 monitors the data usage by the terminal, and notifies 605 the Turbo Manager 302 to deduct the amount of data transmitted to the Internet or external private network 304 during the Turbo Mode usage. The Turbo Manager 302 deducts 606 the specified amount from the remaining Turbo Account Balance 303 for the Terminal 101. The Terminal 101 then updates 607 the remaining balance on the Turbo Mode screen on the Terminal 101. In FIG. 5, for example, the remaining balance is displayed as 95 Mbytes (504). The remaining balance may be continuously updated while the terminal 101 transmits data during the Turbo mode or after the Turbo mode ends. In an alternative embodiment, the remaining balance can be calculated within the terminal by software on the terminal that monitors data transmission volume through a network port of the terminal.

Figure 4:
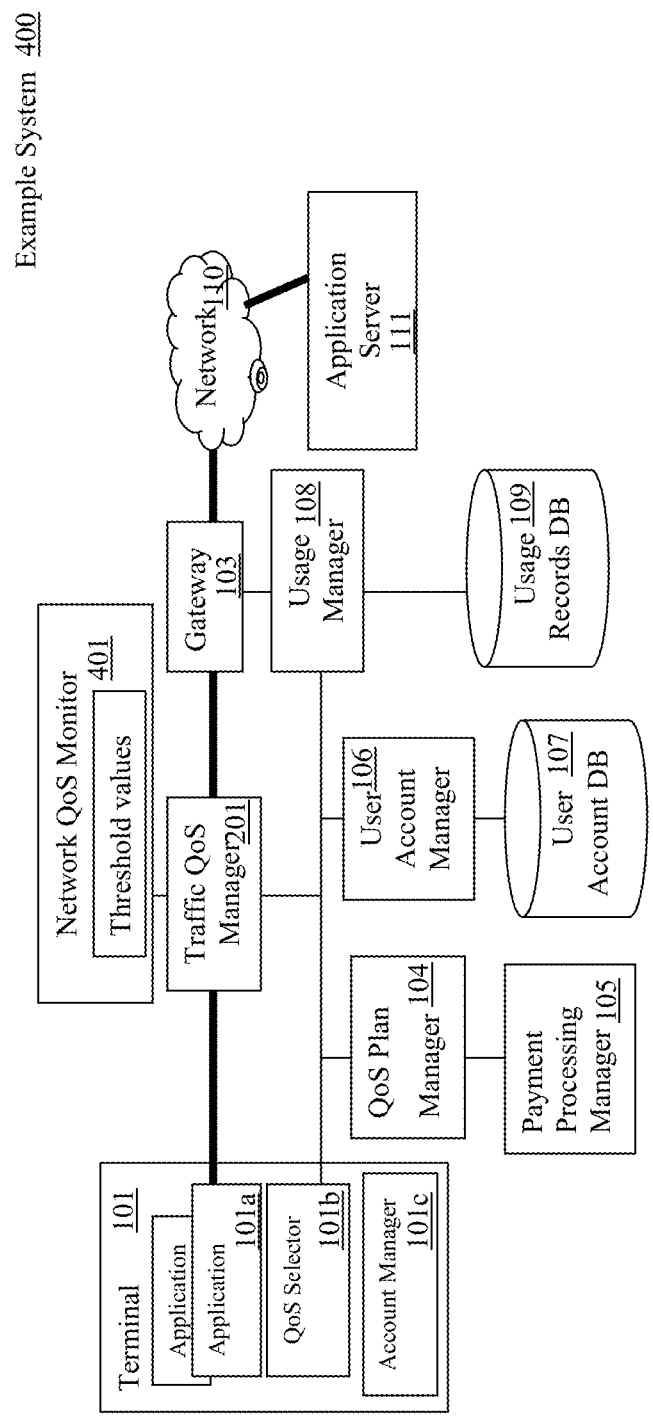
FIG. 4 illustrates an example system where a user may purchase and specify a mode of network service while the network monitors and identifies the overall network quality of control needs, and the final quality of service is decided and selectively enforced.

In an alternate embodiment of the invention, such as illustrated in FIG. 4, the system receives requests, not direction or instruction, of maximum QoS values directly from user terminal while the Network QoS Monitor 401 collects and analyzes QoS as required to manage the overall network resources, and the Traffic QoS Manager 201 decides the QoS level to users based on data usage history of requesting users, such as amount of data transmission by the user on a higher QoS mode during a predetermined amount of time in the past. For example, the system may accept QoS requests from those users whose amount of data transmission in the higher QoS mode during the past 24 hours is less than a threshold value set forth by the system, whereas the system may reject the request if the requesting user has already used an amount of data that is above the threshold value according to the user's usage record. Such a threshold value, as well as the sampling time period is not limited to this example, and are configurable as it is stored and referred to by the Network QoS Monitor 401. In another embodiment, methods to reconcile between quality of service specified between the users and the network management can be based on preconfigured heuristic rules applied to user's network usage records, or dynamically generated rules base upon historical usage trends, current network demand, and other factors. In some embodiments, it is the Traffic QoS Manager 201 such as shown in FIG. 4 that makes the final decision on QoS enforcement. In other embodiments, other modules or programs could also be used to make that determination. Alternatively, the Network QoS Monitor 401 may be implemented as a part of the Traffic QoS Manager 402.

Figure 7:
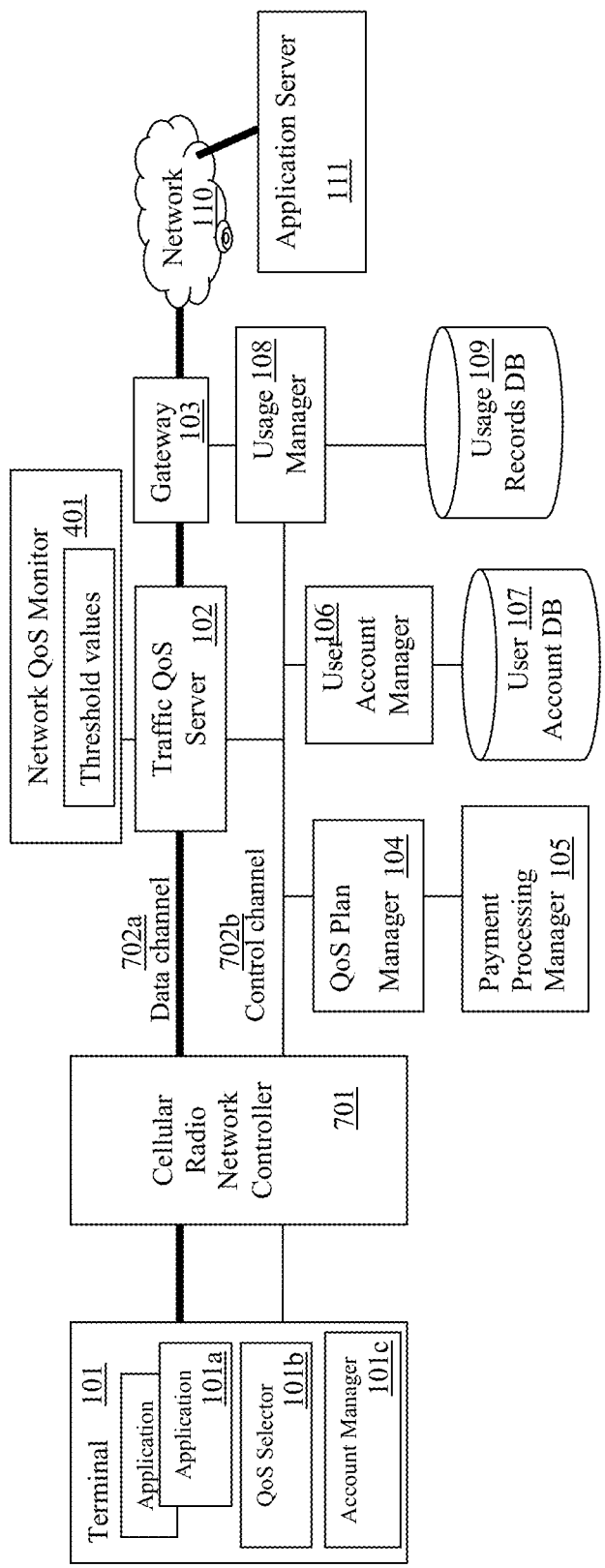
FIG. 7 illustrates an example system that supports a cellular network connection for the Terminal.

FIG. 7 shows an embodiment where a terminal is connected to the network via a cellular wireless network. The QoS Plan Manager 104 may reject a user's request to change the QoS mode from normal to high if the network has not allocated the level of QoS that satisfies the mode requirement. For example, the cellular wireless unit may be connected to a radio access network which has allocated a low bandwidth to the unit if there are not sufficient network resources and/or channels on the radio network because of congestion. The QoS Plan Manager 104 may receive information about the currently allocated radio network resources for respective terminals from the Cellular Radio Network Controller 701, which allocates network resources to terminals.

With this rejection feature, the terminal may not be set to the higher QoS mode despite the user's requested higher mode when the radio network physically cannot accommodate the level of QoS that the user specifies. Such a situation may occur when there is high demand of radio channel resources at specific locations that the terminal attempts to connect to the radio network.

Figure 8:
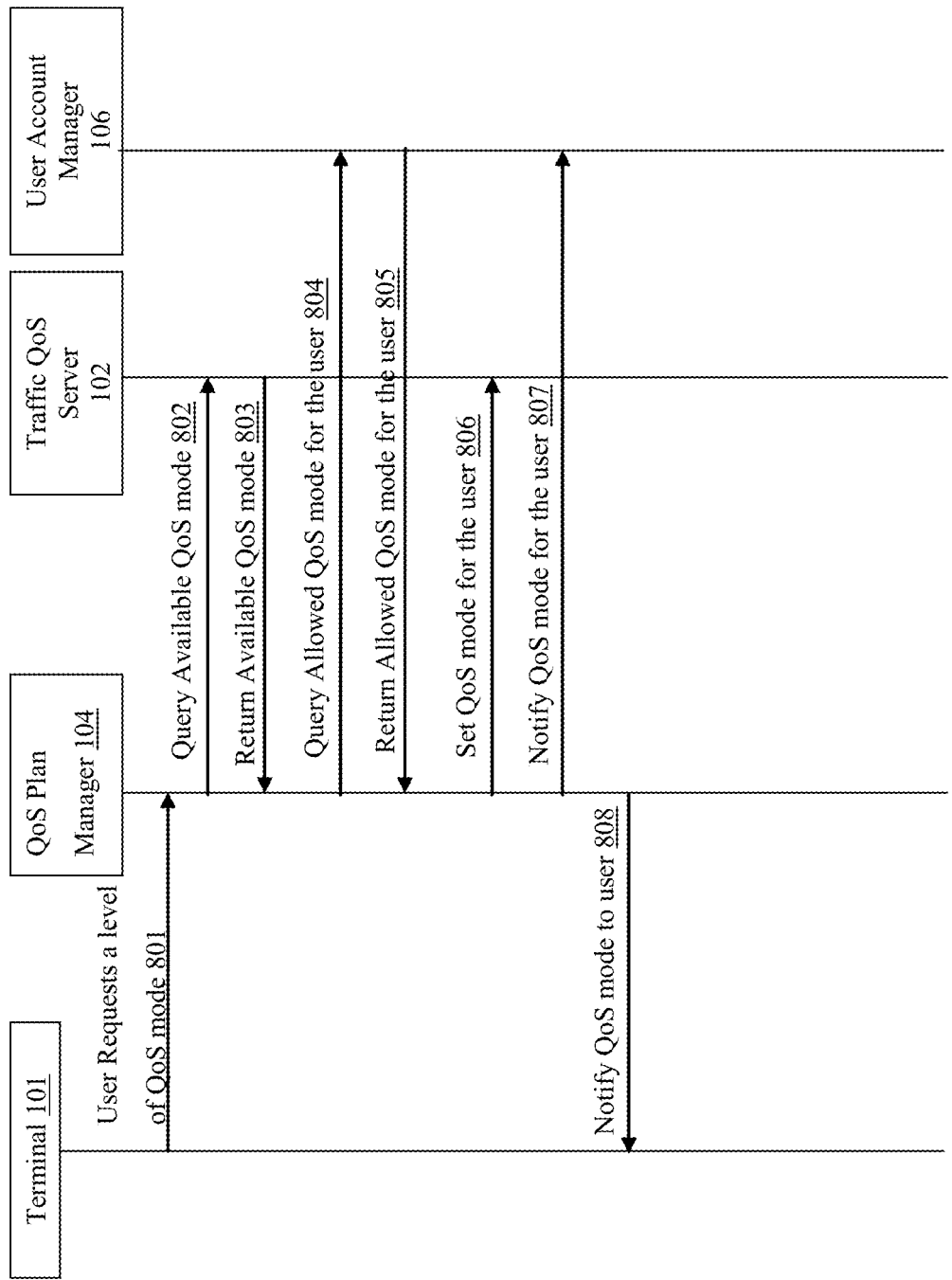
FIG. 8 illustrates an example sequence of communications for changing a Quality of Service.

Another embodiment comprises the following sequence of communications to selectively grant different levels of QoS to specific users, as illustrated in FIG. 8. A first step is for a user operating the Terminal 101 to select a QoS mode value such as a maximum network speed that the user desires, and the Terminal 101 sends the request to QoS Plan Manager 104 (801). A second step is for QoS Plan Manager 104 to query Traffic QoS Server 102 a value of a maximum network speed or Available QoS, which the network can provide to the Terminal 101 based on network resources available for data communications (802). Such a QoS level depends on the level of network accesses as well as the level of network utilization at the time. A third step is for QoS Plan Manager 104 to retrieve from Traffic QoS Server 102 a set of conditions of QoS that is available to the user at the Terminal 101 (803). The set of conditions may include information on a remaining balance of an account that the user has, from which a predetermined amount is deducted each time or each data volume unit the user sends and receive data while the QoS as specified by the user is provided. The set may also include other parameters such as network destination addresses as well as types of contents that the user is attempting to access over the network. The system may grant a specific level of QoS of data communication to the user at the terminal if the terminal connects with pre-determined or designated network destination addresses. For example, a user may establish a connection with a better QoS if the user is accessing documents that are stored in servers at his work. In some other embodiments, the system may grant a specific level of QoS and usage fee rates if the user at the terminal is transmitting data that is of a specific content type. For example, the system may grant a higher level of QoS of data transmission if the user at the terminal transmits particular types of media contents such as video streaming. A fourth step is to query User Account Manager 106 a QoS mode that is allowed for the user (804). And, a fifth step is for QoS Plan Manager 104 to retrieve an allowed level of QoS such as the maximum network speed for the user based on conditions such as a remaining balance of the user (805). Then, QoS Plan Manager 104 sets an appropriate level of QoS for the user (806). The level of QoS may be set at one or more points on the network that the data passes through between a user terminal and a destination server. QoS Plan Manager 104 notifies User Account Manager 106 the new level of QoS set for the user (807). QoS Plan Manager 104 notifies the Terminal 101 the new QoS mode (808).

In some embodiments, QoS Plan Manager 104 may allow and set the level of QoS at step 806 as requested from the Terminal 101 in step 801, without verifying against available levels of QoS by skipping the aforementioned steps 802, 803, 804, and 805.

In some embodiments, the Traffic QoS Manager 201 and the QoS Plan Manager 104 may compare QoS requests from the network as well as requests from respective users, and determine a level of QoS to provide to the terminal based on pre-determined heuristic rules stored within the Traffic QoS Manager 201 or other rules depending upon the implementation.

In one embodiment of the invention, a user who is operating a server or a terminal that transmits data to a peer terminal can specify a desirable QoS of data communication between the server or the terminal and the peer terminal, where both of them are on the network such as on the same cellular wireless network, at the time that the server or the terminal sends or receives data over the network to or from the peer terminal. In this aspect of the invention, the peer terminal is not necessarily connected to the network at the time that the desirable QoS is specified. The user of the server or the terminal communicates with the network operator which the peer terminal would connect to, and purchases a QoS such as a Turbo plan for the peer terminal by registering identifications such as subscriber or equipment information of the server/terminal and the peer terminal. In this case, two Turbo plans, one for the first terminal and the other for the second terminal or the server, are used. The network operator then applies the QoS such as Turbo mode that the Turbo plan has been purchased for when the peer terminal connects to the network and transmits data with the server or the terminal. In this embodiment, the user of the peer terminal has not gone through the process of purchasing the Turbo plan but may still enjoy the better QoS over the network as needed.

In one embodiment, the Traffic QOS Manager 201 disconnects a network connection between the terminal and the network when the system changes QoS settings such as the maximum allowed network speed. In another embodiment, the system dynamically changes the speed and settings without disconnecting the connections.

In another embodiment, a user account used to subscribe or to purchase plans and the Turbo Plan is associated with multiple terminals. In such an embodiment, the User Account database 107 may contain information to associate more than one terminal (such as terminal IDs) with the user. Accordingly, one plan that specifies a set of QoS, such as but not limited to a guaranteed maximum network speed, can be shared among more than one terminal under the same user account as long as the plan is valid under the user account.

Figure 9:
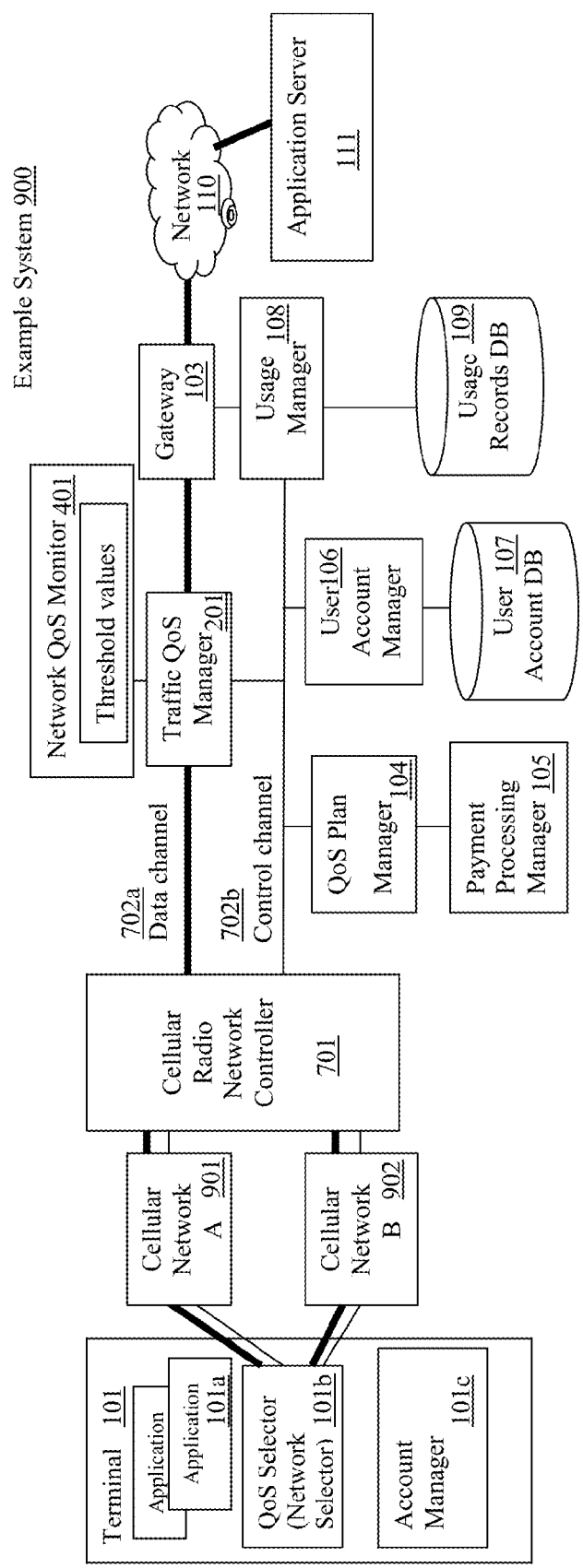

FIG. 9 illustrates another embodiment where a terminal is able to connect with at least one of multiple networks. These networks feature different characteristics such as available network speeds. For example, Network A 901 may include a 3G UMTS network while the Network B 902 may include a 4G LTE network. When a user selects a level of QoS to transmit data over the networks to communicate with a destination, the QoS Selector 101*b* may determine whether to transmit data over Network A 901 or over Network B 902, based on the level of QoS (e.g. network speed) available on the respective networks. For example, the terminal may transmit data over the Network B 902 (e.g., a 4G LTE network) if a user operating the terminal specifies a higher level of the maximum network speed; otherwise, the terminal may transmit data over the Network A 901 (e.g., a 3G UMTS network).

Figure 10:
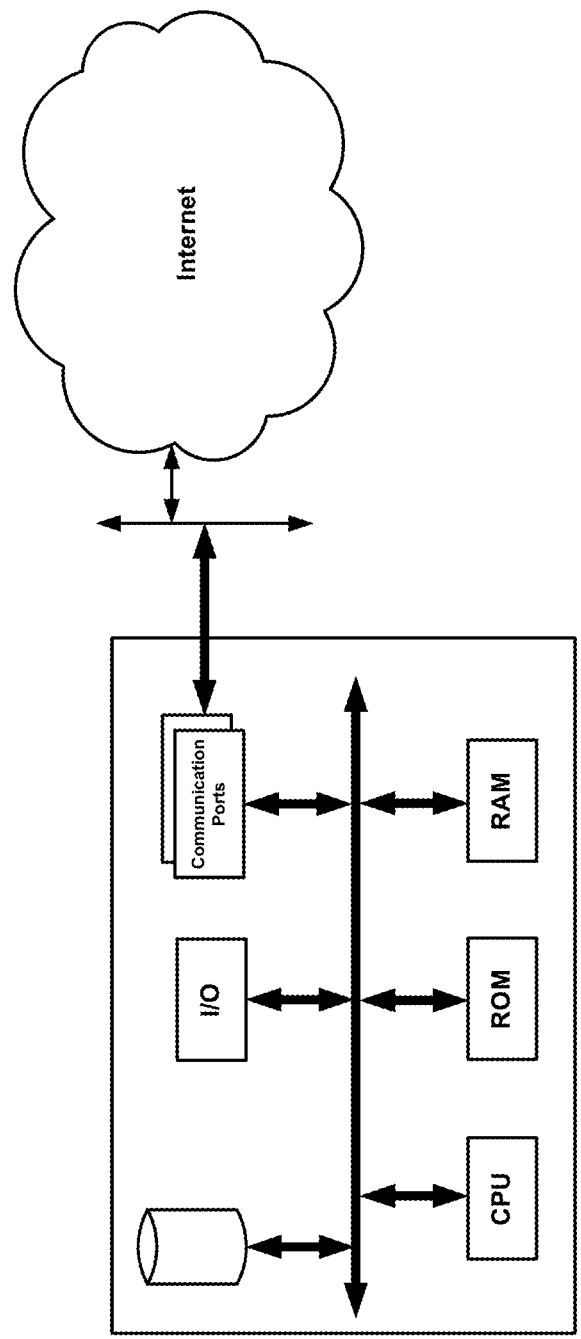
FIGS. 10 and 11 are functional block diagram illustrations of computer hardware platforms that could be used in accordance with embodiments of the present invention.
Figure 11:
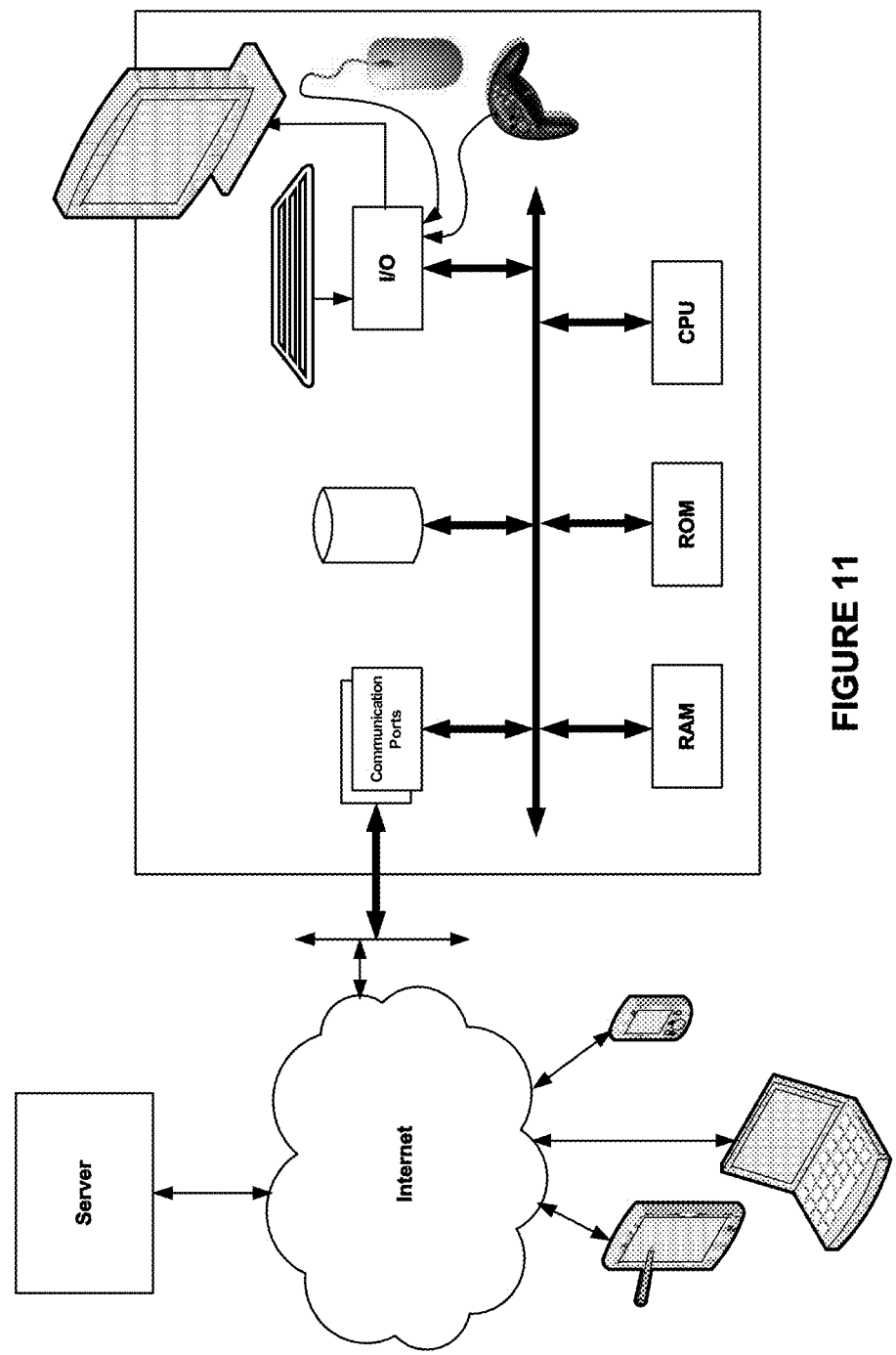

FIGS. 10 and 11 provide examples of functional block diagram illustrations of computer hardware platforms. FIG. 10 shows an example of a network or host computer platform, as may be used to implement a server or electronic devices, according to an embodiment. FIG. 11 depicts a computer with user interface elements, as may be used to implement a personal computer, electronic device, or other type of work station or terminal device according to an embodiment, although the computer of FIG. 11 may also act as a server if appropriately programmed. The systems and methods described herein may be implemented in or upon such computer hardware platforms in whole, in part, or in combination. The systems and methods described herein, however, are not limited to use in such systems and may be implemented or used in connection with other systems, hardware or architectures. The methods described herein may be implemented in computer software that may be stored in the computer systems and servers described herein.

A computer system or server, according to various embodiments, may include a data communication interface for packet data communication. The computer system or server may also include a central processing unit (CPU), in the form of one or more processors, for executing program instructions. The computer system or server may include an internal communication bus, program storage and data storage for various data files to be processed and/or communicated by the server, although the computer system or server may receive programming and data via network communications. The computer system or server may include various hardware elements, operating systems and programming languages. The server or computing functions may be implemented in various distributed fashions, such as on a number of similar or other platforms.

The computer system may also include input and output (I/O) devices such as a mouse, game input device or controller, display, touch screen or other I/O device or devices in various combinations.

The methods described herein may be implemented in mobile devices such as mobile phones, mobile tablets and other mobile devices with various communication capabilities including wireless communications, which may include radio frequency transmission infrared transmission or other communication technology. Thus, the hardware described herein may include transmitters and receivers for radio and/or other communication technology and/or interfaces to couple to and communication with communication networks.

The methods described herein may be implemented in computer software that may be stored in the computer systems including a plurality of computer systems and servers. These may be coupled over computer networks including the internet. Accordingly, an embodiment includes a network including the various system and devices coupled with the network.

Further, various methods and architectures as described herein, such as the various processes described herein or other processes or architectures, may be implemented in resources including computer software such as computer executable code embodied in a computer readable medium, or in electrical circuitry, or in combinations of computer software and electronic circuitry.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neural network) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, email, etc.) over the Internet and/or other computer networks via one or more data transfer protocols (e.g., HTTP, FTP, SMTP, etc.). When received within a computer system via one or more computer-readable media, such data and/or instruction-based expressions of components and/or processes under the systems and methods may be processed by a processing entity (e.g., one or more processors) within the computer system in conjunction with execution of one or more other computer programs.

Unless specifically stated otherwise, as apparent from the following discussions, it is appreciated that throughout the specification, discussions utilizing terms such as "processing," "computing," "calculating," "determining," or the like, may refer in whole or in part to the action and/or processes of a processor, computer or computing system, or similar electronic computing device, that manipulate and/or transform data represented as physical, such as electronic, quantities within the system's registers and/or memories into other data similarly represented as physical quantities within the system's memories, registers or other such information storage, transmission or display devices. It will also be appreciated by persons skilled in the art that the term "users" referred to herein can be individuals as well as corporations and other legal entities. Furthermore, the processes presented herein are not inherently related to any particular computer, processing device, article or other apparatus. An example of a structure for a variety of these systems will appear from the description herein. In addition, embodiments of the invention are not described with reference to any particular processor, programming language, machine code, etc. It will be appreciated that a variety of programming languages, machine codes, etc. may be used to implement the teachings of the invention as described herein.

Unless the context clearly requires otherwise, throughout the description and the claims, the words 'comprise,' 'comprising,' and the like are to be construed in an inclusive sense as opposed to an exclusive or exhaustive sense; that is to say, in a sense of 'including, but not limited to.' Words using the singular or plural number also include the plural or singular number respectively. Additionally, the words 'herein,' 'hereunder,' 'above,' 'below,' and words of similar import refer to this application as a whole and not to any particular portions of this application. When the word 'or' is used in reference to a list of two or more items, that word covers all of the following interpretations of the word: any one or more of the items in the list, all of the items in the list and any combination of the items in the list.

The various features described above may be combined in various combinations. Without limitation, features described may be combined with various systems, methods and products described. Without limitation, multiple dependent claims may be made based on the description herein. While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

While preferred embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A computer-implemented method for controlling levels of quality of service (QoS) for transmitting data between a terminal and a network, comprising:
    enforcing a first level of a QoS to a connection between the terminal and the network;
    receiving a specific user-requested, second level of the QoS from the terminal, wherein the specific user-requested second level of the QoS is independent of network availability;
    determining, after receiving the specific user-requested, second level of the QoS, a currently-available level of the QoS on the network;
    determining a third level of the QoS based at least in part on the currently-available level of the QoS on the network and based in part on the received specific user-requested, second level of the QoS; and
    enforcing the third level of the QoS to the connection between the terminal and the network.

2. The method of claim 1, further comprising causing display, via a user interface, of a currently-enforced level of the QoS on the terminal.

3. The method of claim 2, further comprising enabling adjustment of the currently-enforced level of the QoS from the terminal.

4. The method of claim 1, wherein the QoS pertains to a best-effort-based maximum speed of data transmission over the network.

5. The method of claim 1, wherein the QoS pertains to both a best-effort-based maximum speed of data transmission over the network and a maximum amount of data volume allowed for the transmission over a period of time.

6. The method of claim 5, wherein the first level of the QoS includes a first best-effort-based maximum speed of data transmission and a first maximum data volume, and the second level of the QoS includes a second best-effort-based maximum speed of data transmission and a second maximum data volume.

7. The method of claim 1, wherein determining the third level of the QoS comprises:
    determining whether a user account balance is sufficient for the second level of the QoS.

8. The method of claim 1, wherein the first level of the QoS is associated with a first data plan and the second level of the QoS is associated with a second data plan.

9. The system of claim 8, wherein enforcing the third level of the QoS comprises switching from the first data plan to the second data plan.

10. The method of claim 1, wherein the specific user-requested, second level of the QoS includes at least one parameter selected from the group consisting of minimum network speed, maximum network speed, amount of data volume that is permitted to transmit over the network, latency of data transmission, priority of data traffic from a user's device with respect to traffic from other devices on the network, priority of data traffic to a user's device with respect to traffic from other devices on the network, amount of data transmission bandwidth, resolution of types of data, bandwidth, and error rates of transmitted data.

11. A computer-implemented method for providing specific combinations of maximum network speeds and maximum bandwidths by network traffic control comprising:
    enforcing a first combination of a first maximum network data speed and a first maximum data volume to one or more connections between a terminal and a communication destination over a network when the terminal is connected to the network;
    receiving a user-specified request from the terminal for a second combination of a second maximum network speed and a second maximum data volume while the terminal is connected to the network, wherein the user-specified request is independent of network availability;
    assessing a currently-available maximum network speed and maximum data volume on the network;
    determining that the second maximum network speed and the second maximum data volume received in the user-specified request are available based on the assessed currently-available maximum network speed and maximum data volume on the network; and
    based on the determination that the second maximum network speed and the second maximum data volume received in the user-specified request are available, enforcing the second combination of the second maximum network data speed and the second maximum data volume to at least some of the one or more connections between the terminal and the network.

12. A system for providing a specific maximum network speed by real-time modulation of network traffic control comprising:
    one or more processors; and
    memory, including instructions executable by the one or more processors to cause the computer system to at least:
        enforce a predetermined maximum network speed to one or more connections between a terminal and the network;
        receive a request for a desired maximum network speed from the terminal, wherein the desired maximum network speed is independent of network availability;
        validate the desired maximum network speed based at least in part on a user account balance;
        assess a currently-available maximum network speed after receiving the request for a desired maximum network speed from the terminal;
        determine that desired maximum network speed is within the assessed currently-available maximum network speed;
        enforce the desired maximum network speed to at least some of the one or more connections between the terminal and the network;
        detect invalidity of the desired maximum network speed; and change, in response to the detected invalidity, the currently-enforced maximum network speed to the predetermined maximum network speed.

13. The system of claim 12, wherein:

the system comprises of a first network and a second network that are connected via a gateway, a maximum network speed allowed in the first network being no more than a maximum network speed allowed in the second network;

the terminal is connected to the gateway using the first network;

the gateway is connected to a destination terminal using the second network; and the desired maximum network speed is enforced in the first network or at the gateway.

14. The system of claim 12, wherein validating the desired maximum network speed based at least in part on a user account balance comprises validating purchase of an amount of data volume that is associated with the second level of the QoS.

* * * * *